March 29, 1966  O. SAHM  3,242,545

TUBULAR ROPE CLIP

Filed Dec. 11, 1964

3,242,545
TUBULAR ROPE CLIP
Otto Sahm, 8 Behringstrasse, Bremerhaven-Geestemunde, Germany
Filed Dec. 11, 1964, Ser. No. 417,734
Claims priority, application Germany, Apr. 15, 1964, S 48,425
1 Claim. (Cl. 24—123)

This invention relates to rope clips.

Metal tubular rope clips are known which consist of two parallel straight portions and two semi-circular portions connecting the same. Such rope clips are used for rigidly connecting two adjacent pieces of rope, for example the end of a rope and a consecutive portion of the same rope in order to form a loop.

After the pieces of rope have been introduced the clip is pressed under high pressure to a circular shape, the pieces of rope being squeezed into one another and into the clip material. The resultant friction between the pieces of rope and the clip is such that the connection can withstand considerable forces without becoming disengaged. The compression of the clip—the material of which is subjected to considerable stress at the high pressures occurring—makes great demands of the material properties and the shaping of the tubular clip blank. The straight wall portions which are subjected to the greatest load must be prevented from buckling so that the material tears instead of flowing.

The wall thickness of the clip blank is therefore generally made much thicker than would be necessary in view of the forces subsequently occurring in the rope and the frictional forces required. An excessive amount of material is therefore used and high deformation forces therefore have to be applied.

It has therefore already been proposed to thicken the central part of the straight side walls, such thickened portions extending either both inwardly and outwardly or else just inwardly, so that the clip has an 8-shaped inside cross-section. This procedure has not overcome all the difficulties; it has made the production of such clips expensive because expensive dies were required for production purposes.

According to the present invention there is provided a tubular rope clip consisting of two parallel straight portions and two semi-circular portions connecting the same, characterized in that the wall thickness of the parallel straight portions is uniformly larger than that of the semi-circular portions.

This means that while the semi-circular portions can still be made thinner than was previously possible the blanks can at the same time be made more cheaply and more accurately and uniformly. The material also flows uniformly on compression. The clip may be made of any suitable material, for example metal or plastics.

In order that the present invention may be well understood there will now be described a preferred embodiment thereof, given by way of example, with reference to the accompanying drawings in which.

Figure 1:
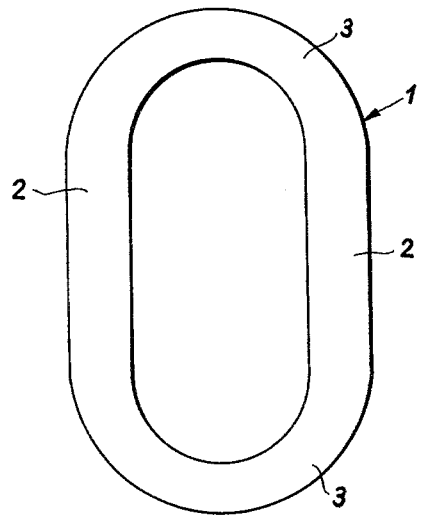
FIGURE 1 is a cross-section through a rope clip according to the invention.
Figure 2:
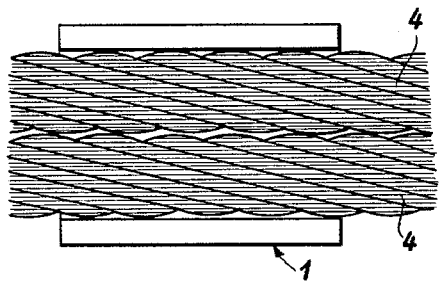
FIGURE 2 is a central longitudinal section through the rope clip to a reduced scale with pieces of rope inserted in the clip.
Figure 2A:
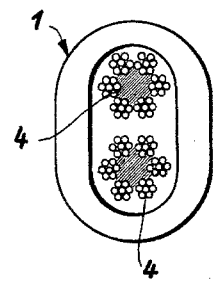
FIGURE 2a is a cross-section through the arrangement shown in FIGURE 2.

The rope clip 1 comprises the parallel straight portions 2 and the semi-circular portions 3 connecting the same. It will be clear particularly from FIGURE 1 that the straight portions 2 have a uniform wall thickness greater than the wall thickness of the portions 3. In the example illustrated the wall thickness of the portions 3 decreases from one wall portion 2 to the top of the curved part and then increases again towards the other portion 2. This ensures a uniform transition but the wall thickness of the portions 3 could be different from that illustrated provided that they are always thinner than the portions 2.

Figure 3:
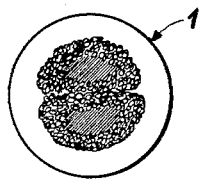
FIGURE 3 is a cross-section after the clip together with the pieces of rope has been compressed.

The ropes 4 are conventionally introduced into the rope clip and deformed together with the latter under high pressure in press jaws so as to give a substantially circular shape as shown in FIGURE 3.

The material of the portions 2 flow partly between the rope portions 4 where it fills the free cavities. Any excess material laterally escaping between the press jaws is either clamped by the latter or removed in known manner.

What I claim is:

A tubular rope clip consisting of two parallel straight portions and two semi-circular portions connecting the same, characterized in that the wall thickness of the parallel straight portions is uniformly larger than that of the semi-circular portions with the wall thickness of the semi-circular portions decreasing from one of the straight portions to the apex of the curved portion and then increasing toward the other straight portion, said tubular rope clip being formed of ductile material and applied to the rope and swaged thereon.

References Cited by the Examiner

UNITED STATES PATENTS

| | | | |
|---|---|---|---|
| 438,400 | 10/1890 | Brennen | 287—78 |
| 2,476,731 | 7/1949 | Hobbs. | |
| 3,008,208 | 11/1961 | Stephan. | |
| 3,184,817 | 5/1965 | Chesnais. | |

FOREIGN PATENTS

| | | |
|---|---|---|
| 1,355,968 | 2/1964 | France. |
| 561,859 | 6/1944 | Great Britain. |

BERNARD A. GELAK, *Primary Examiner.*